US 9,411,140 B2

(12) United States Patent
Debarre et al.

(10) Patent No.: US 9,411,140 B2
(45) Date of Patent: Aug. 9, 2016

(54) METHOD AND SYSTEM FOR CALIBRATING A SPATIAL OPTICAL MODULATOR IN AN OPTICAL MICROSCOPE

(75) Inventors: Delphine Debarre, Paris (FR); Thibault Vieille, Noisy-le-Roy (FR); Emmanuel Beaurepaire, Palaiseau (FR); Jean-Louis Martin, Bures sur Yvette (FR)

(73) Assignee: ECOLE POLYTECHNIQUE, Palaiseau (FR)

( * ) Notice: Subject to any disclaimer, the term of this patent is extended or adjusted under 35 U.S.C. 154(b) by 464 days.

(21) Appl. No.: 13/988,823

(22) PCT Filed: Nov. 21, 2011

(86) PCT No.: PCT/FR2011/052717
§ 371 (c)(1),
(2), (4) Date: Jun. 18, 2013

(87) PCT Pub. No.: WO2012/069749
PCT Pub. Date: May 31, 2012

(65) Prior Publication Data
US 2013/0278744 A1    Oct. 24, 2013

(30) Foreign Application Priority Data

Nov. 22, 2010  (FR) .................................... 10 59590

(51) Int. Cl.
*G02B 21/26* (2006.01)
*G02B 26/06* (2006.01)
(Continued)

(52) U.S. Cl.
CPC ................ *G02B 21/00* (2013.01); *G02B 21/06* (2013.01); *G02B 26/06* (2013.01); *G02B 27/0068* (2013.01)

(58) Field of Classification Search
USPC ........................................................ 348/79
See application file for complete search history.

(56) References Cited

U.S. PATENT DOCUMENTS 5,148,502 A * 9/1992 Tsujiuchi ............... H04N 5/262
                                                  348/5.051
5,598,261 A * 1/1997 Duncan ..................... G01J 9/00
                                                  250/201.9

(Continued)

OTHER PUBLICATIONS

International Search Report dated Feb. 21, 2012, corresponding to PCT/FR2011/052717.

(Continued)

*Primary Examiner* — Jamie Atala
*Assistant Examiner* — Patrick Demosky
(74) *Attorney, Agent, or Firm* — Young & Thompson (57) ABSTRACT

A method and system for calibrating an optical device having a spatial optical modulator (6) and including: an optical lens (8) of a large numerical aperture, capable of receiving an incident beam and/or collecting an optical beam reflected by a sample; a camera (14) disposed in a plane optically conjugate with the focal plane of the lens (8); and a spatial optical modulator (6) disposed on the optical beam upstream of the camera (14). The method includes the following steps consisting in: acquiring three-dimensional images of the PSF in terms of intensity in a plane conjugate with the focal plane of the lens (8), reconstructing the profile in terms of amplitude and/or phase of the beam using a phase diversity algorithm, and determining the respective influence functions of a plurality of elements $P_1, \ldots, P_N$ of the spatial optical modulator (6) on the profile in terms of the amplitude A and/or phase $\phi$ of the beam.

8 Claims, 4 Drawing Sheets

(51) Int. Cl.
*G02B 5/08* (2006.01)
*G02F 1/29* (2006.01)
*G02B 21/00* (2006.01)
*G02B 21/06* (2006.01)
*G02B 27/00* (2006.01)

(56) References Cited

U.S. PATENT DOCUMENTS

| | | | | |
|---|---|---|---|---|
| 5,969,334 | A * | 10/1999 | Hutchin | G01J 1/20 250/201.9 |
| 7,397,018 | B1 * | 7/2008 | Pham | G02B 26/06 250/201.1 |
| 8,254,714 | B2 * | 8/2012 | Pauca | G06T 5/003 382/260 |
| 8,620,065 | B2 * | 12/2013 | Piestun | G06T 7/0048 382/106 |
| 2006/0049331 | A1 * | 3/2006 | Smith | G01J 1/4257 250/201.9 |
| 2007/0091486 | A1 * | 4/2007 | Dowski | G02B 5/284 359/857 |
| 2010/0278400 | A1 * | 11/2010 | Piestun | G01N 21/6456 382/128 |

OTHER PUBLICATIONS

D. Turaga, et al.; "Image-Based Calibration of a Deformable Mirror in Wide-Field Microscopy"; Applied Optics, Optical Society of America, vol. 49, No. 11; Apr. 10, 2010; pp. 2030-2040.

Tobias Haist, et al.; "Scene-based Wavefront Correction With Spatial Light Modulators"; vol. 7064; Aug. 11, 2008; pp. 70640M-1-70640M-11.

Mats G. Lofdahl, et al.; "Calibration of a Deformable Mirror and Strehl Ratio Measurements by Use of Phase Diversity"; Applied Optics, vol. 39, No. 1; Jan. 1, 2000; pp. 94-103.

D. Debarre, et al.; "Image-Based Adaptive Optics for two.photon Micrscopy"; Vo. 34, No. 16, Aug. 15, 2009; pp. 2495-2497.

* cited by examiner

METHOD AND SYSTEM FOR CALIBRATING A SPATIAL OPTICAL MODULATOR IN AN OPTICAL MICROSCOPE

TECHNICAL FIELD

The present invention relates to a method and a system for the calibration of an optical device having a spatial optical modulator. More precisely, the invention relates to a method and a device for calibrating the influence of a spatial optical modulator placed in or upstream of an optical microscope on the quality of the images obtained in this microscope.

STATE OF THE ART

The development of new imaging techniques in optical microscopy (confocal microscopy, by structured illumination, scanning fluorescence microscopy, stimulated emission depletion (STED), non-linear optical techniques, etc.) and of new applications in biological or biomedical imaging requires optical microscopes producing images of excellent quality. The microscopy of objects that are planar or located in the air generally gives images of very high resolution. Nevertheless, the optical microscopy of thick biological samples meets problems of optical aberrations that limit the spatial resolution of the images. Such optical aberrations may come from the objective of the microscope, from an index mismatch between the objective, the immersion medium and the sample, or of the nature of the sample itself, which may present local internal variations of refractive index.

The use of spatial optical modulators in a microscope has already been proposed to spatially modulate an optical beam in amplitude and/or in phase or to correct optical aberrations. Generally, a spatial optical modulator is a device for amplitude and/or phase modulating the spatial profile of the incident field. Among the spatial optical modulators, there can be mentioned in particular deformable mirrors provided with actuators and liquid-crystal spatial light modulators (SLM). In the following of the present document, it is meant by spatial optical modulator an optical component comprising a plurality of elements linked to control means for modulating the amplitude and/or the phase of a light beam. The different technologies of spatial optical modulation allow operating in reflection or in transmission with variable performances in terms of spatial resolution, response time and wavelength response. For example, a liquid-crystal spatial modulator allows modulating a beam with a very good spatial resolution, wherein each pixel can be controlled individually.

The use of a mirror whose surface can be deformed by actuators finds applications in active optics for improving the quality of the images produced by optical instruments and in adaptive optics to modulate a wavefront at a high temporal frequency. The adaptive optics is in particular implemented in the large telescopes intended for astronomy observation to correct in real time the image deformations induced by the atmospheric turbulences. In microscopic imaging, the optical aberrations may vary from one sample to one another but, in most applications, the variation of the aberrations in an image is relatively slow with respect to time. However, in certain applications of microscopy, it may also be necessary to optimize very rapidly the quality of the detected image. The adaptive optics has thus been proposed as a solution to compensate for the optical aberrations in a microscope and to improve the limits of resolution in microscopic imaging, in particular in applications of biology.

In an adaptive optics microscope, a deformable mirror is generally used to induce a modulation of the exciting light beam wavefront and also possibly a modulation of the signal collected through the microscope objective. This modulation results in a variation of the amplitude and phase profile at the entrance of the microscope objective, itself inducing a variation of the exciting pulse response (Point Spread Function or PSF) of the microscope. The PSF represents the response of an optical system to a source point and describes how each point of an object is modified by the optical system to form the resulting image observed in terms of intensity.

According to the type of sample observed in microscopy, it is desired that precise deformations can be applied to compensate for example for the astigmatism or a defocusing of the beam. Hence, the publication D. Débarre et al. "Image-based adaptative optics for two-photon microscopy", Optics Letters, vol. 34, No. 16, p. 2495-2497, describes the improvement of microscopy images by the use of a deformable mirror controlled by predefined functions of the combined Zernike mode type.

In the case of a liquid-crystal spatial modulator, the control of each pixel produces a phase modulation, known a priori, on a per-pixel basis. However, the exact positioning of the SLM with respect to the beam is generally unknown. Now, the exact influence of an amplitude and/or phase spatial optical modulator on an optical beam depends on both the position and the size of the optical beam with respect to the spatial optical modulator. This influence is generally not known in advance, whether it is in the focal plane of an optical device, i.e. where the optical beam is focused, or in the plane of the pupil, where the optical beam is extended.

Indeed, there exist methods for calibrating for example a deformable mirror in a telescope or a microscope.

A first group of calibration techniques is based on the analysis of the wavefront phase in the plane of the pupil after reflection on a deformable mirror. A first solution is based on the use of a wavefront analyzer, for example of the Shack-Hartmann type, which allows a measurement of the local deformations of the wavefront of an optical beam. However, a wavefront analyzer is expensive and has geometric limits. The coupling of a SHS to a microscope is restricting because, as the detected beam diameter is limited (to about 5 mm), it is necessary to adapt the magnification of the beam between the entrance pupil of the microscope and the wavefront analyzer for each microscope objective for which the deformable mirror has to be calibrated. Moreover, the spatial resolution of the phase by an analyzer of the Shack-Hartmann type is limited to about 30×30 pixels.

A second solution is based on the measurement and the analysis of interference fringes in an interferometer of the Michelson or Twyman-Green type, to deduce therefrom the phase variations of the wavefront. Therefore, the publication D. Débarre et al. "Image-based adaptative optics for two-photon microscopy", Optics Letters, Vol. 34, No. 16, p. 2495-2497, uses a mirror located in the focal plane of the objective so as to calibrate specifically the region of the mirror imaged in the rear pupil of the objective. However, the interferometric measurements require a meticulous process of alignment and need a source with a large coherence length. In the applications of microscopy using a pulse laser beam, the interferometer needs another optical source, which is generally arranged at another position and at another wavelength than that of the target application. Moreover, an interferometer has a size that is not easily compatible with a microscope.

Another group of techniques is based on a measurement of the intensity pulse response (or PSF) in the focal plane of the device and on a calculation of amplitude and/or phase reconstruction of the wavefront, for example according to a method referred to as "phase diversity". The measurement of pulse response generally consists in acquiring the image of a source point placed in the focal plane of the device through the optical device to be characterized. The phase diversity method consists firstly in measuring at least two images of a same object with a known phase-shift between the two images, secondly modeling the complex field in the Fourier plane of each image, often by decomposing the phase on a Zernike polynomial basis, and finally applying a minimization algorithm to the fields corresponding to the two images, to extract therefrom an amplitude and/or phase spatial reconstruction of the wavefront.

In the case of an adaptive optics telescope for astronomy, Löfdahl et al. has proposed a device and a method for the calibration of a deformable mirror based on a phase diversity method (Löfdahl et al. "Calibration of a deformable mirror and Strehl ratio measurements by use of phase diversity", Appl. Opt. 39, pp. 94-103, 2000). The experimental device for PSF measurement comprises a source point generator of an entrance optical beam, a uniformly illuminated pupil, a deformable mirror reflecting the beam under an almost-zero numerical aperture, and a large-focal lens forming the image of the beam reflected by the deformable mirror on a high-resolution camera. Two phase-shift PSF images are obtained by insertion of a prism in front of the camera, which hence forms two images axially defocused with respect to each other. The calibration of the influence of the deformable mirror on the wavefront is then obtained by a conventional method of evaluation and minimization of the wavefront according to a decomposition on a Zernike polynomial basis. However, according to the method of Löfdahl et al., the matrix of calibration of the deformable mirror is not only noisy but also incomplete, because this method does not allow measuring the tip and the tilt induced by the deformable mirror, which have to be calibrated by an independent measurement. Moreover, although a telescope magnifies the image of a source point, a microscope forms a smaller image thereof. Hence, the method of calibration of Löfdahl cannot be used directly in microscopy, where the microscope objective focuses the beam into a spot that is too small to be viewed directly and where the numerical aperture of the objective is generally high.

In microscopy, the wavefront reconstruction by phase diversity has been modified to be applied to devices having large numerical apertures (Hanser et al., "Phase-retrieved pupil functions in wide-field fluorescence microscopy", J. Microscopy 216, pp. 32-48 (2004); Hanser et al., "Phase retrieval for high-numerical-aperture optical systems", Opt. Lett. 28, pp. 801-803 (2003)). In particular, in a device having a large numerical aperture, the function of the pupil of the system can no longer be considered as being constant.

Theoretically, the PSF corresponds to the image of an infinitely small source point, of wavelength $\lambda$ and located in the center of the focal plane of the objective. Experimentally, to measure the PSF of an optical microscope, Hanser et al. chooses a source point formed by a fluorescent ball whose size is lower than the limit of optical resolution of the microscope, the ball being placed in the focal plane of the microscope and illuminated by an excitation beam. However, the signal of fluorescence of these balls is limited both in intensity and in time, which limits the signal-to-noise ratio that is available for the PSF measurement. The weakness of the signal requires the use of a very high sensitivity camera, hence a high cost of the device. On the other hand, in order to improve the analysis, it has been attempted to increase the complexity of the reconstruction algorithm, which decreases the precision of the result obtained. Moreover, the balls used have a finite size, which produces errors in the PSF measurements, which may be critical in microscopy. Finally, the publications Hanser 2003 and Hanser 2004 do not relate to a microscope with a spatial optical modulator.

In adaptive optics microscopy, the publication Turaga et al. describes a method for the calibration of a deformable mirror by a variant of the phase diversity ("Image-based calibration of a deformable mirror in wide-field microscopy", Turaga et al., Appl. Opt. 49, pp. 2030-2040, 2010). In this case, the PSF measurement of a fluorescent ball is performed in the single focal plane of the objective (no phase-shifted images) and the reconstruction algorithm uses all the measurements performed for the different commands sent on the different actuators of the deformable mirror so as to determine the phase profile of the beam at the exit of the objective. This method has two major limitations. On the one hand, the intensity profile of the beam is supposed to be known, which is generally not the case, and invariant, which restricts the application of the method to the calibration of a deformable mirror conjugated with the entrance pupil of the objective. On the other hand, the calculation time required for the reconstruction of the phase profiles is very long (3 minutes per active element for a system with 32 MB RAM, i.e. about 2H30 for a deformable mirror with 52 actuators).

Finally, more fundamentally, in the publications Löfdahl et al., Hanser et al. and Turaga et al., due to the reduced number of measurements performed (1 or 2), the robustness of the minimization algorithm has to be in compensation provided by the modeling a priori of the searched wavefront, which is decomposed according to Zernike modes or according to another base of functions, supposed to be orthogonal, and better adapted to the geometry of the deformable mirror. This intrinsically reduces the precision of the phase reconstruction and limits the method of calibration to the case where the mirror, positioned in a plane conjugate to the entrance pupil of the objective, induces a pure modulation of phase and where the field amplitude in the rear pupil is considered as being constant.

In the present document, the terms "rear pupil" and "entrance pupil" are used as synonymous and refer to the plane conjugate to the focal plane of the objective.

The publication Botcherby et al., "an optical technique for remote focusing in microscopy", Opt. Comm. 281, pp. 880-887 (2008), describes an alternative method of measurement of the PSF of a microscope objective. This method uses a mirror placed in the vicinity of the focal plane of the microscope objective and a CCD camera located in a plane conjugate to the focal plane of the objective. Images are acquired for different axially offset positions of the planar mirror or of the camera, so as to obtain the intensity PSF in three dimensions. Nevertheless, this PSF measurement is not used for amplitude and phase reconstruction of a field profile, nor a fortiori in the context of calibration of a deformable mirror.

Technical Problem

One object of the invention is to propose a device and a method for the precise and reliable calibration of a spatial optical modulator in situ in a microscope.

Another object of the invention is to propose a device for the calibration of a spatial optical modulator compatible with different microscope objectives without requiring an instrument adaptation at each change of objective.

Still another object of the invention is to propose a method of calibration allowing a high spatial resolution and high precision calibration, including for the peripheral points of the field of the rear pupil, where the intensity of the optical beam is relatively low.

The present invention has for object to propose a method for calibrating the influence of the commands applied to the elements of a spatial optical modulator on the optical properties of a microscope in or upstream of which a spatial optical modulator is inserted.

For that purpose, the invention relates to a method for the calibration of an optical device having a spatial optical modulator, said device comprising a light source point, an optical objective of large numerical aperture adapted to receive an incident beam and/or to collect an optical beam reflected by a sample, a camera placed in a plane that is optically conjugate to the focal plane of the objective and a spatial optical modulator placed on the optical beam upstream of the camera. According to the invention, the method comprises the following steps:

a) placement of a reflective planar sample in the vicinity of the focal plane of the objective;

b) application of a command of amplitude $R^i_j$ on an element $P_i$ of the spatial optical modulator, in such a manner to modulate the optical beam incident and/or reflected on the sample;

c) acquisition of an image of the intensity PSF in a plane conjugate to the focal plane of the objective;

d) modification of the relative axial distance between the objective and the reflecting sample by a known quantity Z;

e) iteration of the steps c) and d) for a plurality of relative axial distances between the sample and the focal plane of the objective;

f) reconstruction of the amplitude and/or phase profile of the beam in a plane conjugate to the focal plane of the objective by a phase diversity algorithm for a value $R^i_j$ of an element $P_i$;

g) iteration of the steps b) to f) for a plurality of amplitude values $R^i_j$ for an element $P_i$ of the spatial optical modulator;

h) determination of the influence function $E_i$ of an element $P_i$ on the amplitude profile A and/or phase profile $\phi$ of the beam;

i) iteration of the steps b) to h) for the different elements $P_{i\ i=1,\ldots,N}$ of the spatial optical modulator;

j) determination of the influence functions ($E_1, \ldots E_N$) of all the elements ($P_1, \ldots P_N$) of the spatial optical modulator on the amplitude profile A and/or phase profile $\phi$ of the beam.

According to a particular embodiment of the invention, the PSF measurements are performed for three relative axial distances between the objective and the sample, defined with respect to the position of the sample in the focal plane of the objective, in such a way that: $z=(-z_0, 0, +z_0)$.

According to a preferred embodiment, the step f) of reconstruction of the amplitude and/or phase profile of the beam by phase diversity comprises the following steps:

Initialization:
 estimation of a defocus term corresponding to the three relative positions $-z_0$, 0 and $+z_0$;
 initial estimation of the field profile in the entrance pupil of the objective;
 estimation of the transmission profile of the entrance pupil of the objective;

Calculation Algorithm:
 calculation of three field profiles by multiplying the field profile estimated in the entrance pupil of the objective by each of the three defocus terms, respectively;
 application of a Fourier transform to calculate the estimated PSFs for the three relative positions $-z_0$, 0 and $+z_0$;
 replacement of the amplitude of the calculated PSFs by the value of the PSFs respectively measured for each of the values of z ($-z_0$, 0, $+z_0$);
 application of a reverse Fourier transform for the three fields obtained;
 division by the defocus term corresponding to each position z ($-z_0$, 0, $+z_0$) respectively;
 averaging of the three complex fields obtained;
 multiplication of the field average by the transmission profile of the entrance pupil of the objective, to obtain a new estimation of the field profile at the rear pupil of the objective;
 iteration of all the steps of the algorithm of calculation of the amplitude and/or phase profile reconstruction until one ending condition is fulfilled;

Ending:
 calculation of the amplitude square deviation between the three PSFs calculated and measured. If the value is lower than a convergence criterion (typically of the order of $10^{-6}$ in relative deviation), the algorithm is ended;
 the profile phase is extracted and unfolded by means of an Fourier transform algorithm.

According to a particular embodiment, the method of calibration of the invention comprises an additional step, previous to step j), said additional step consisting in an iteration of the steps b) to i) for different simultaneous combinations of commands for a plurality of elements of the spatial optical modulator.

According to a particular aspect of an embodiment, the method of calibration of the invention comprises, following step c), an additional step of digital filtering of the measured PSF images so as to reduce the spatial resolution and/or to adapt the size of the images to the size of the pupil of the objective.

According to a particular embodiment, the method of calibration of the invention comprises, following step j), an additional step of inversion of the influence functions of all the elements ($P_1, \ldots P_N$) of the spatial optical modulator by a linear regression algorithm to extract therefrom a calibration of the deformable mirror in terms of amplitude $A(x,y)=M_A(R^i_t)$ and/or $R^i_t=M_A^{-1}(A(x,y))$ and in terms of phase $\phi(x,y)=M\phi(R^i_t)$ and/or $R^i_t=M\phi^{-1}(\phi(x,y))$, respectively.

The invention also relates to a system for the calibration of an optical device having a spatial optical modulator, said device comprising a light source point generating an incident beam, an optical objective of large numerical aperture adapted to receive an incident beam and/or to collect an optical beam reflected by a sample, an image of the source point being formed in the focal plane of the objective, a spatial optical modulator comprising a plurality of elements ($P_1, \ldots P_N$) and means for controlling said elements ($P_1, \ldots P_N$) of said spatial optical modulator, the spatial optical modulator being placed on the optical beam so as to modulate the incident and/or reflected optical beam, said system of calibration comprising:

a reflective planar sample placed in the vicinity of the focal plane of the objective;

a means of adjustment of the distance z between the focal plane of the objective and said sample;

an optical system adapted to receive a part of the beam reflected by said sample and to form an image of the focal plane of the objective in a conjugate plane;

a camera placed in said plane optically conjugate to the focal plane of the objective; and a control system comprising a unit for controlling the means of adjustment of the distance z, a unit for controlling the elements ($P_1, \ldots P_i, \ldots P_N$) of the spatial optical modulator, a unit for processing the images acquired by the camera for a plurality of distances z adapted to deduce therefrom a measurement of the PSF of the device, and calculation means adapted to determine the values of the commands to be applied to the means of adjustment of the distance z and to the elements of the spatial optical modulator, respectively, as a function of the PSF measurements.

According to various particular aspects of the system of calibration of the invention, the calculation means comprise:

means for reconstructing the amplitude and/or phase profile of the beam using a phase diversity algorithm;

means for determining the influence functions ($E_1, \ldots E_N$) of all the elements $P_1, \ldots P_N$ of the spatial optical modulator on the amplitude profile A and/or phase profile $\phi$ of the beam; and/or means for inversing the influence functions of all the elements $P_1, \ldots P_N$ of the spatial optical modulator by a linear regression algorithm and minimization means for deducing therefrom a calibration of the spatial optical modulator.

The present invention also relates to the characteristics that will become evident from the following description and that will have to be considered either alone or in any technically possible combination thereof.

This description, which is given by way of non-limitative example, will allow a better understanding of how the invention can be implemented, with reference to the appended drawings in which:

DETAILED DESCRIPTION

Figure 1:
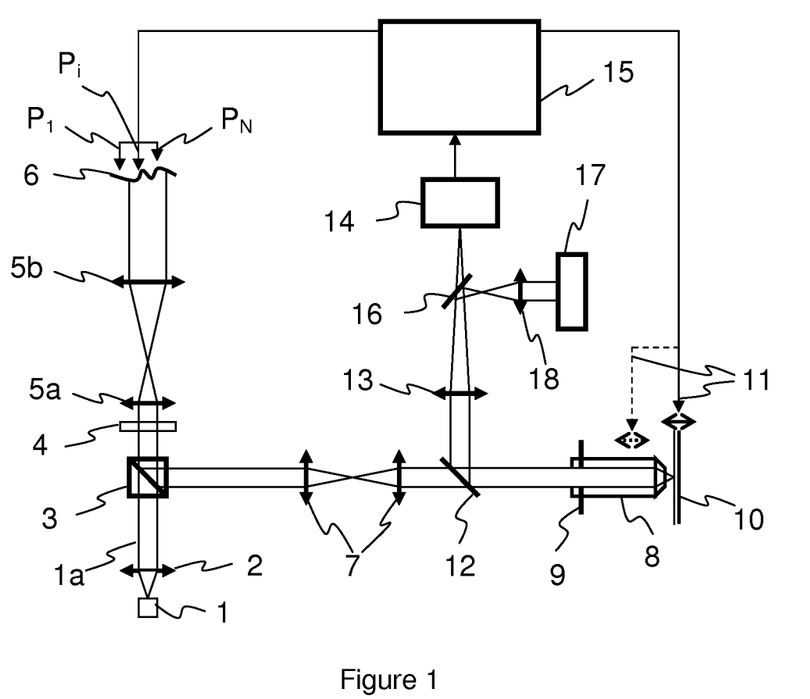
FIG. 1 schematically shows a calibration device according to a first embodiment of the invention.

FIG. 1 shows a first example of implementation of an experimental device of calibration of a spatial optical modulator 6 in a microscope. In the example shown, the spatial optical modulator is a deformable mirror comprising a plurality of actuators. However, the spatial optical modulator could be another type of spatial modulator (liquid-crystal SLM, for example), without departing from the scope of the invention. Only a part of the components of the microscope have been shown in FIG. 1. In particular, the tube of the microscope is not shown in FIG. 1.

A light source 1 generates an excitation beam 1a intended to illuminate a sample 10. The light source may be part of the microscope or be coupled to an entrance port of the microscope. The source may be a continuous source or a pulse source, such as a pulse laser. The source 1 is advantageously the source intended to be used afterwards in the target application. In the case of a laser source, the spatial extent of the source may be very limited, so that an entrance diaphragm is not necessary. In the case of a spatially extended source, a diaphragm small enough to be considered as a point has to be placed on the incident beam in a plane optically conjugate to the focal plane of the objective (in practice, the size of the diaphragm has to be at most of half the width of the Airy spot corresponding to the ideal excitation PSF of the system). In the following of the present document, the light source 1 is liken to a source point.

The source beam 1a is coupled to the optical path of the microscope by an optical system 2.

A polarization separator cube 3 sends the incident beam toward a plate 4 (of the $\lambda/4$ plate type) and an afocal optical system 5a, 5b, to illuminate a deformable mirror 6. The deformable mirror 6 is placed in or upstream of the microscope, so as to induce a modulation of the wavefront of the exciting light beam. The deformable mirror 6 has a reflective surface that may be deformed by actuators $P_1, \ldots P_i, \ldots P_N$. Different technologies of actuators (magnetic, piezoelectric . . . ) exist. The actuators are controlled by a control system 15, which may send commands to only one actuator or simultaneously to several actuators. The deformable mirror 6 used in reflection on the incident beam is conjugate to the entrance pupil 9 of an microscope objective 8.

The polarization separator cube 3 receives the beam reflected and modulated by the deformable mirror 6. After a double passage through the $\lambda/4$ plate oriented at 45° with respect to the incident polarization, the polarization state of the beam is rotated by 90° and the beam initially transmitted by the cube 3 is reflected without loss of power. The cube 3 sends back the modulated beam toward an optical system 7 that directs the latter toward the microscope objective 8, so as to cover the field of the pupil 9. The diameter of the pupil 9 generally determines the numerical aperture of the microscope objective 8. The numerical aperture of a microscope objective is generally comprised between 0.2 and 1.45.

The microscope includes a sample carrier on which is disposed a sample 10 placed in the vicinity of the focal point of the microscope objective 8. The sample 10 is preferably a planar mirror. If the objective 8 used is adapted to be used with a slide covering the sample, a slide having the required thickness is bonded to the mirror by means of an optical adhesive or a drop of oil for objective. In the case of an immersion microscope objective to be immersed in a medium with an optical index, an immersion medium (for example: air, water, glycerol, oil) with an index adapted to the immersion objective is added between the mirror and/or the slide and the objective so as to be in normal conditions of use of the objective.

The sample carrier is mounted on a positioning system 11, for example piezoelectric, providing the relative axial displacement between the objective 8 and the sample 10, possibly covered with a slide, according to the objective used.

The calibration device of FIG. 1 comprises a separating plate 12 (for example a semi-reflective plate) placed upstream of the objective 8. The plate 12 takes a part of the beam reflected by the sample 10, which is then focused by an optical system 13 on a camera 14, so that the detection plane of the camera 14 is optically conjugate to the focal plane of the objective 8.

The control system 15 comprises a unit for controlling actuators $P_1, \ldots P_i, \ldots P_N$ of the deformable mirror 6, a unit for controlling the objective-sample positioning system 11, an image processing unit for processing the images acquired by the camera 14 and a calculation unit for determining the values of the commands to be applied to the actuators $P_1, \ldots P_i, \ldots P_N$ of the deformable mirror 6 and to the system 11 for positioning the objective-sample axial distance, respectively, as a function of the measurements of the image PSF according to an algorithm detailed hereinafter.

In order to compare the measurements obtained by the device of calibration of the invention with those obtained directly by a known wavefront sensor, a removable mirror 16 is placed on the path of the beam reflected by the sample, a wavefront analyzer 17 of the Shack-Hartmann (SHS) type and an optical coupling lens 18. The lens 18 is chosen as a function of the objective 8 to adapt the size of the beam profile to that of the wavefront sensor 17. Instead of using several lenses 18, it may also be used a variable-focal-length telescope. The wavefront analyzer 17 may then provide a reference measurement of the spatial distribution of the wavefront in the plane of the pupil 9. However, the SHS 17, the lens 18 and the removable mirror 16 are not parts of the calibration device of the invention.

The operation of the device of FIG. 1 will now be described. The source beam 1a is coupled by an optical system 5a, 5b to the deformable mirror 6. The deformable mirror 6 induces a modulation of the wavefront of the exciting light beam. This modulation results in a variation of the phase and amplitude profile in the plane of the entrance pupil 9 of the microscope objective 8. Such variations of the wavefront profile induce a variation of the intensity exciting pulse response (PSF) of the microscope detected by the camera 14. That is this variation of the wavefront profile that is used to correct the aberrations induced by the microscope or by the sample itself, or to shape the PSF for purpose of imaging, photoactivation, photoablation, etc. In the case where the detected signal is reflected again on the deformable mirror 6 (cf. the device of FIG. 2 or 3), there is also a modulation of the detection pulse response.

Generally, to calibrate all the modulations induced by the deformable mirror 6, it is considered in the following of this document not only the excitation PSF but also the resulting PSF obtained in the plane where are located the detectors. The PSF depends intrinsically on the different elements present on the optical path—deformable mirror 6, optical components of the microscope, objective 8—by also on their relative position. The influence of each active element (or actuator $P_1, \ldots P_i, \ldots P_N$) of the deformable mirror 6 depends on the optical assembly realized. To be precise, the calibration of the mirror has thus to be performed in situ in the configuration of measurement of the target application.

Figure 2:
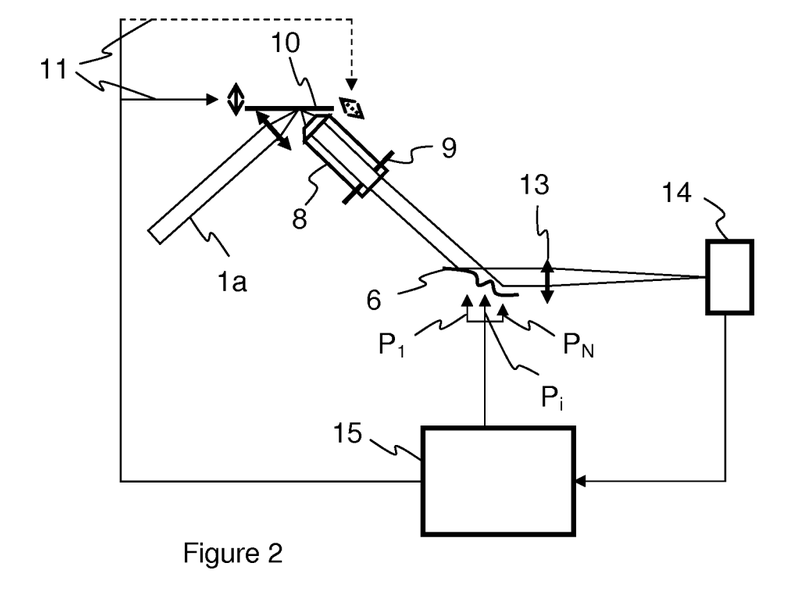
FIG. 2 schematically shows a calibration device according to a second embodiment of the invention.

FIG. 2 shows a second example of implementation of an experimental device of calibration of a deformable mirror 6 in another type of microscope, operating in reflection under oblique incidence. The device of FIG. 2 includes elements similar to those of the device of FIG. 1, the deformable mirror being not placed on the path of the exciting beam but on the path of the beam reflected by the sample 10. An optical system 13 forms the image of the beam reflected by the sample and modulated by the deformable mirror 6 on the camera 14. Similarly to the device of FIG. 1, a control system 15 comprises a unit for controlling the actuators $P_1, \ldots P_i, \ldots P_N$ of the deformable mirror 6, a unit for controlling the objective-sample positioning system 11, a unit for processing images acquired by the camera 14 and a calculation unit for determining the values of the commands to be applied to the actuators of the deformable mirror 6 and to the positioning system 11, respectively, as a function of the measurements of the image PSF according to an algorithm detailed hereinafter.

Figure 3A:
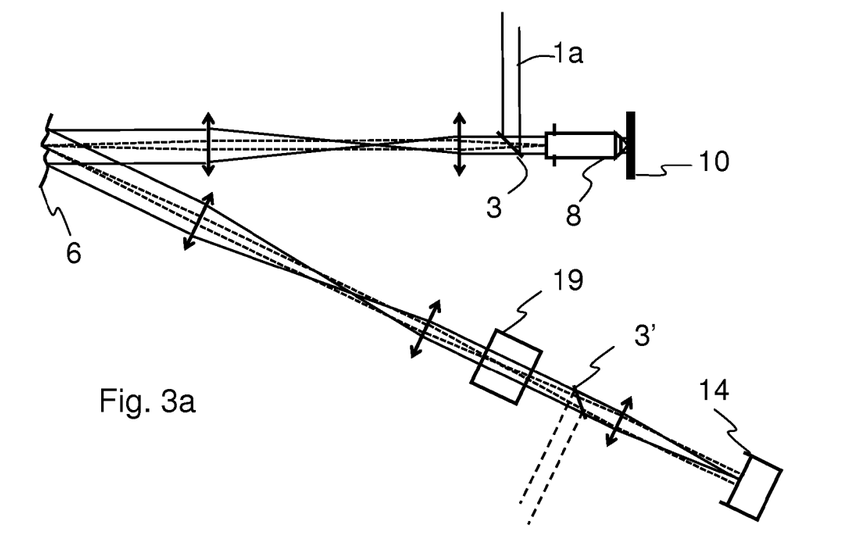
FIG. 3 schematically shows a calibration device according to a third embodiment of the invention.
Figure 3B:
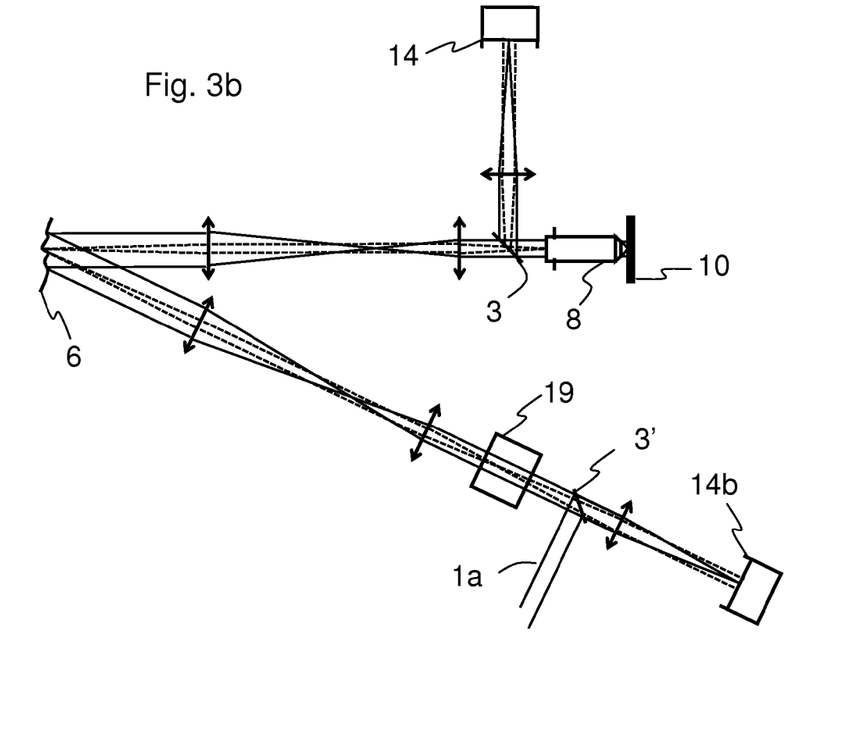

The device illustrated in FIG. 1 shows an assembly where a separating plate 12 is placed just upstream to the objective 8, which is ideal to measure the excitation PSF. However, the unit: separating plate 12, lens 13 and camera 14 may be placed anywhere on the path of the beam as long as the camera 14 is conjugate to the focal plane of the objective 8 and as, before reaching the camera, the beam is not reflected on the spatial modulator before and after the passage through the objective. In the case, for example, where it is desired to measure the influence of the deformable mirror on the total PSF (excitation+detection) of a confocal microscope, the two PSFs (excitation and detection) have to be measured successively. However, it is generally possible to mixed them up if the excitation and detection wavelengths are identical or close to each other, and to realize only the most practical measurement according to the geometry of the device. Therefore, FIG. 3 shows a third example of implementation of an experimental device of calibration of a deformable mirror 6 in a microscope. The device of FIG. 3 includes elements similar to those of the devices of FIGS. 1 and 2, the deformable mirror 6 being herein placed, during the imaging, both on the path of the exciting beam and on the path of the beam reflected or created by the sample which is imaged. To calibrate such a microscope, it is then possible to measure the detection PSF (FIG. 3a) by modifying the path of the incident beam and by placing the camera 14 at the place of the usual detector; or to measure the excitation PSF (FIG. 3b) by placing the unit: separating plate 12, lens 13 and camera 14 just after the objective. By way of example, the device shown in FIG. 3 comprises a beam scanning device 19, also called XY scanner, which allows performing a scanning of the laser beam on the sample, and a point detector (for example, pinhole+photomultiplier) for detecting the confocal signal.

The method of calibration of the invention also applies in the case of an upright, reversed or horizontal microscope. In all the cases, a planar mirror is used in the vicinity of the focal point with, if necessary, a microscope slide above it, which may be fastened by a dot of oil for microscope or of optical adhesive.

Method of Calibration

Figure 4:
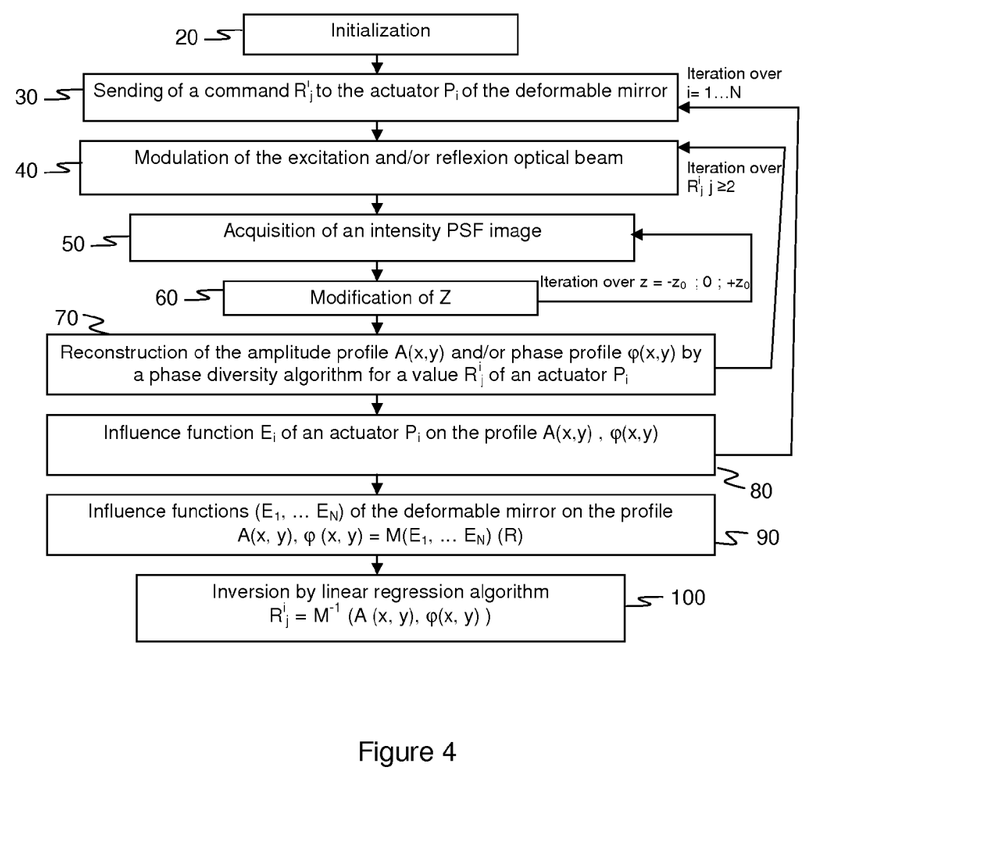
FIG. 4 schematically shows the main steps of the method of the invention.

FIG. 4 schematically shows the main steps of the method of calibration of the invention, based on a phase diversity algorithm.

The calibration of the deformable mirror 6 is performed according to the following steps:
  initialization of the system (step 20), the planar mirror 10 being positioned at a first position in the vicinity of the focal plane of the objective, defined by the distance $z_0$ between the planar mirror ant the focal plane of the objective 8,
  sending of a command vector to the deformable mirror 6 (step 30), so as to modulate the excitation and/or reflection optical beam (step 40),
  measurement of the three-dimensional PSF of the complete optical device (steps 50-60),
  reconstruction of the phase and/or intensity profile at the level of the entrance pupil of the microscope based on the three-dimensional PSF measurement (step 70),
  iteration for different command vectors until the influence of each actuator (if the deformable mirror 6 is linear) or of each possible combination of actuator commands (if the deformable mirror 6 is not linear) is known (steps 80-90),
  inversion of the influence functions to deduce therefrom the calibration of the deformable mirror (step 100).

According to a preferred embodiment of the invention, the method comprises the following steps:
  the measurement of the intensity PSF of the microscope is performed by means of a planar mirror 10 placed in the vicinity of the focal plane of the objective 8 to reflect an excitation beam and of a camera 14 placed in a plane conjugate to the focal plane of the objective;
  acquisition of three PSF measurements for three different known axial positions of the planar mirror by means of a device of axial displacement of the sample carrier or of the objective (steps 50-60);

reconstruction—to within a factor—of the phase and amplitude profile of the exciting beam in the plane of the pupil 9 of the objective 8 from the three axial PSF measurements using an iterative algorithm (step 70);

iteration of the preceding steps for different positions of each actuator of the deformable mirror (steps 30 to 70);

calculation of the complex influence function of the actuators of the deformable mirror on the optical field at the entrance of the objective (which determines the three-dimensional PSF) (steps 80-90);

complete and intrinsic determination in situ of the influence of the deformable mirror on the optical properties of the microscope, determined by its PSF (step 100).

Detailed Steps of the Method

The different steps will now be described in detail.

I—Measurement of the PSF

Let's consider, for example, the configuration shown in FIG. 1. Let's suppose that the transmission of the objective 8 is uniform over the whole of its entrance pupil 9 and that the objective 8, the semi-reflective plate 12 and the lens 13 induce no aberration of the beam wavefront. It can be shown that it is measured directly on the CCD camera 14 an image of the PSF, magnified by the magnifying factor of the couple objective 8-lens 13, at the axial position $2 \times z_0$ with respect to the focal plane of the objective 8. Hence, by changing the distance $z_0$ between the planar mirror 10 and microscope objective 8, it is possible to reconstruct a three-dimensional image of the PSF of the system.

In the case where the aberrations induced by the objective 8, the lens 13 and/or the reflective plate 12 cannot be neglected, or in the case where the transmission profile of the objective 8 is not uniform, there exists an additional modulation of the optical transfer function (describing the modification of the phase and intensity profile of the beam), hence the measured PSF is no longer directly that which is obtained at the level of the focal plane. However, this modulation is constant when the shape of the deformable mirror 6 is modified, so that the variation of the phase and intensity profile of the beam linked to the deformable mirror 6 may nevertheless be determined with the same precision.

In the case where the deformable mirror 6 is placed on the excitation beam, it is therefore the excitation PSF (case of FIG. 1) that is measured. Likewise, when the deformable mirror 6 is placed on the beam reflected by the sample, it is the detection PSF (case of FIG. 2) that is measured. Finally, in the case where the deformable mirror 6 is located on the path of the excitation beam and of the reflected beam (case of FIG. 3), either one or the other, or both, are measured to obtain the influence of the deformable mirror on the total PSF (excitation+detection) of the microscope.

II—Reconstruction of the Phase and Intensity Profile of the Beam

Figure 5:
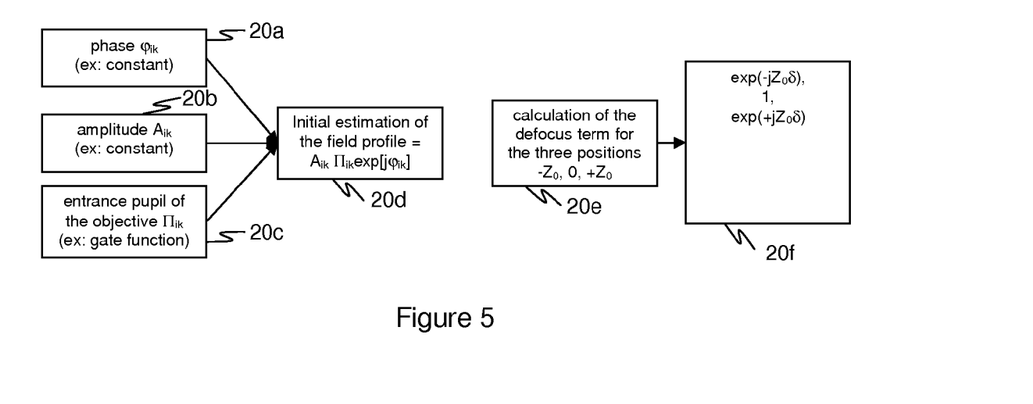
FIG. 5 schematically shows a variant of a step of initialization of the phase diversity algorithm.
Figure 6:
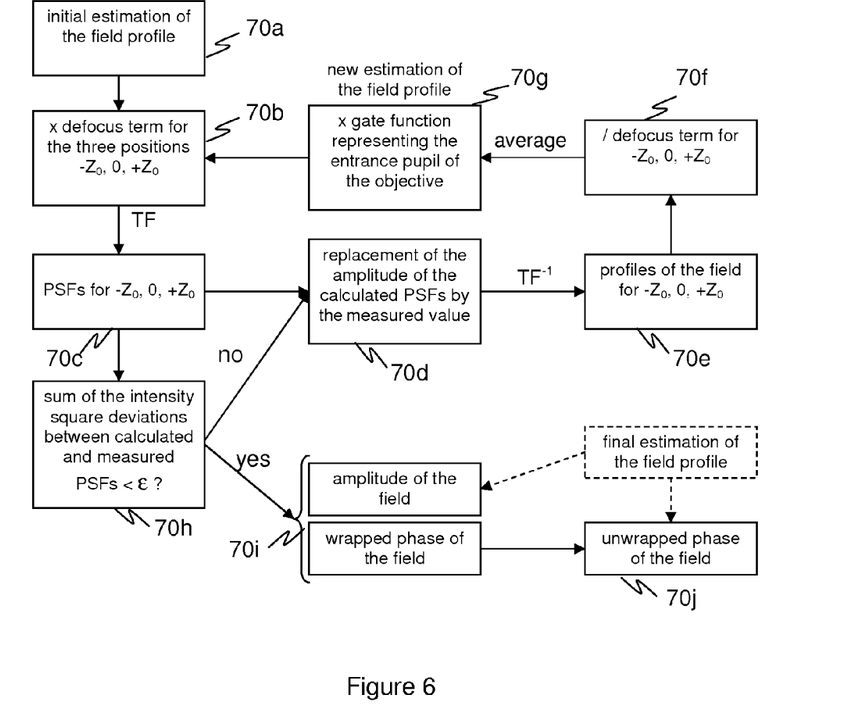
FIG. 6 schematically shows a variant of the phase diversity algorithm according to an embodiment of the invention.
Figure 7:
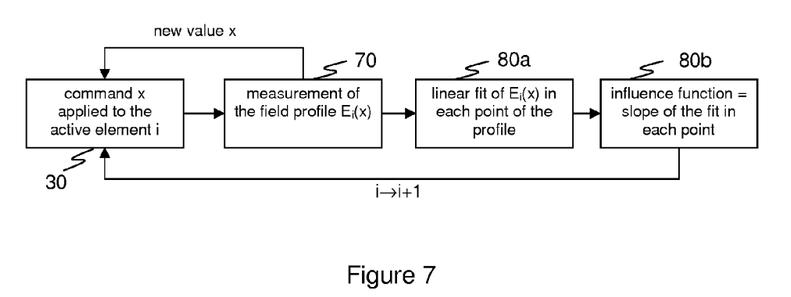
FIG. 7 schematically shows a variant of a step of determination of an influence function of an element $P_i$ of a spatial optical modulator.

FIGS. 5 to 7 schematically show an example of implementation of an algorithm of reconstruction of the amplitude and/or phase profile of the beam from the three-dimensional PSF measurement by a phase diversity algorithm. FIG. 5 shows the steps of initialization of the calculation algorithm, and FIG. 6 shows the iterative steps of reconstruction.

The initialization of the algorithm (FIG. 5) first comprises an initialization (step 20a) of the entrance phase profile by a function $\phi_{ik}$, for example constant over the field of the entrance pupil 9. Likewise, the amplitude $A_{ik}$ of the field on the entrance pupil 9 is initialized (step 20b), the amplitude $A_{ik}$ being for example supposed constant. The transmission profile of the entrance pupil 9 of the objective is estimated (step 20c) by a function $\Pi_{ik}$ that is, for example, a gate function. An initial estimation of the field profile equal to the product $A_{ik}\Pi_{ik}\exp[j\phi_{ik}]$ is deduced therefrom (step 20d). On the other hand, to obtain a good convergence of the phase diversity algorithm in typical conditions of noise on the signal, three images of the PSF are necessary in different planes $z_0$. It is started from the initial estimation of the field profile obtained at step 20d. A defocus term is estimated, which is equal to $\exp(-jz_0\delta)$, 1 and $\exp(+jz_0\delta)$, respectively, for the three relative positions: $-z_0$, 0 and $+z_0$ (steps 20e-20f).

FIG. 6 schematically shows an algorithm of reconstruction of the three-dimensional profile by phase diversity. After the initialization (step 70a, as indicated for example according to the steps 20a, 20b, 20c, 20d in connection with FIG. 5), an initial estimation of the field profile and an initial estimation of the defocus term $\delta$ for the three relative positions: $-z_0$, 0 and $+z_0$ (for example as indicated according to the steps 20e-20f of FIG. 5) are available. At step 70b, three field profiles are calculated by multiplication of the initial field profile by each of the three defocus terms: $\exp(-jz_0\delta)$, 1 and $\exp(+jz_0\delta)$, respectively. A Fourier transform (TF) is applied to calculate the estimated PSFs for the three relative positions $-z_0$, 0 and $+z_0$ (step 70c). Then, the amplitude of the calculated PSFs is replaced by the value of the PSFs measured respectively for each value of z (step 70d). An operation of reverse Fourier transform ($TF^{-1}$) is applied for the three fields obtained (step 70e). A division by the defocus term corresponding to each position: $-z_0$, 0 and $+z_0$ is performed (step 70f). The average of the three complex fields obtained is calculated (step 70g). One multiplies the average of the three fields by the transmission profile of the entrance pupil of the objective (step 70g). The thus-obtained profile serves as a new estimation of the field at the level of the rear pupil of the objective. The steps 70b to 70g are iterated until one ending condition is fulfilled (step 70h).

The ending step comprises for example a calculation of the amplitude square deviation between the three PSFs calculated and measured. If the value is lower than a convergence criterion (typically of the order of $10^{-6}$ in relative deviation), the algorithm is ended. At this stage, an estimation of the field profile is obtained, which comprises, on the one hand, the amplitude of the field and, on the other hand, the generally wrapped phase (modulo $2\pi$) of the field (step 70i). An additional step (step 70j) allows extracting the unwrapped phase of the profile by means of a Fourier transform algorithm. An example of phase unwrapping algorithm is described in the publication D. C. GHIGLIA M. D. PRITT "Two dimensional phase unwrapping: theory, algorithms, & software", ed. Wiley (1998).

The algorithm used allows a complete reconstruction of the phrase and amplitude profile with for only parameters: the size of the camera pixels, the wavelength of the beam, the optical magnification between the focal plane and the plane of the camera, the axial deviation between the three positions $z_0$ used, the numerical aperture of the objective and the index of the immersion medium used. According to the value of these parameters and in order to accelerate the convergence of the algorithm, the starting images may be cropped (reduction of the final resolution on the phase and intensity profiles obtained) or "binned" (adjustment of the reconstructed profile to the size of the entrance pupil of the microscope to avoid excessive margins). In a present implementation with a recent computer (2 MB RAM, processor 2 GHz), the reconstruction takes about 2 seconds per phase profile.

III—Calibration of the Deformable Mirror

In the most current case, where the operation of the deformable mirror 6 is linear, the calibration is obtained by determining the influence function $E_i$ (on the profile of the beam) of each actuator $R_i$. The method is schematically shown by the step diagram of FIG. 7. Each actuator $R_i$ is calibrated one after the other: a series of commands (at least two values for a linear range) is sent on an actuator $R_i$ and the corresponding profile is measured for each command value. The adjustment of the different profiles obtained finally allows determining the influence function $E_i$ of each element $R_i$.

Once the phases obtained for different command values on the active elements of the mirror, in the case of a mirror having a linear behavior, a step of linear regression is used to calculate the influence function of each active element. Then, if it is desired to determine the command vector to be sent to the mirror to obtain a profile of given phase and amplitude, an additional step is used to obtain a command matrix. The matrix links directly the combination of modes (Zernike or others) it is desired to obtain (described by a vector of coefficients, one per mode) to the command vector to be sent to each of the active elements. For example, if it is desired to produce Zernike modes, each influence function $E_i$ is decomposed on the basis of the Zernike modes to be produced and the thus-obtained matrix is pseudo-reversed to obtain the command matrix.

In the less frequent case where the behavior of the deformable mirror 6 is not linear, i.e. when the responses of the actuators are not independent from each other, it is necessary to measure the profile variation of the beam for any possible combination of commands sent to the actuators of the deformable mirror 6.

Example of Experimental Measurements

Measurements have been made on a test stand according to an assembly such as schematically shown in FIG. 1. The deformable mirror 6 used in reflection is conjugate to the entrance pupil 9 of a microscope objective 8. The deformable mirror comprises 52 actuators. A planar mirror 10, possibly covered with a slide according to the objective 8 used, is mounted on a positioning system 11 of the piezoelectric type that provides the relative displacement between the objective 8 and the planar mirror 10. The detection of the PSF is made on a 8-bit CCD camera comprising a matrix of 1200×800 pixels.

In order to evaluate the device and the method of calibration, a removable mirror 16 is also used to measure the wavefront on a wavefront analyzer 17 of the Shack-Hartmann (SHS) type. An additional optical coupling lens 18 is chosen according to the objective 8 to adapt the size of the beam profile to that of the wavefront sensor 17.

In this embodiment, the deformable mirror 6 is conjugate to the entrance pupil 9 of the microscope objective 8. It is the most frequent case of use, for which the modulation induced by the mirror relates only to the phase profile and not to the intensity profile of the exciting beam. The reconstructed intensity profile and function of influence on the phase have been calculated for one of the 52 active elements of the deformable mirror conjugate to the entrance pupil of a 20× air objective, of numerical aperture 0.75. The obtained results have been compared with a measurement obtained on the Shack-Hartmann wavefront measurement device.

In order to evaluate the robustness of the method used, the influence function of a same deformable mirror 6 is measured for three very different microscope objectives 8:
- a slide-corrected, air 20× magnification objective, of numerical aperture 0.75 (entrance pupil of 13.5 mm);
- an air 10× magnification objective, with no slide, of numerical aperture 0.4 (entrance pupil of 9 mm); and
- a slide-corrected, water 60× magnification objective, of numerical aperture 1.2 (entrance pupil of 5.4 mm).

The phase reconstruction in the plane of the objective pupil according to the method of the invention gives results that are perfectly comparable to the direct measurements obtained on the Shack-Hartmann wavefront sensor, for the three objectives. Moreover, it is observed that the method of the invention allows obtaining a measurement of the phase with a better spatial resolution than that provided by the Shack-Hartmann, even with a standard CCD camera that presents a resolution of one megapixel, whereas the currently available SHS sensors are limited to about 30×30 pixels. Moreover, the SHS lacks precision on the edges of the image, where the beam is less luminous. On the contrary, the method of the invention provides a phase profile with a good sensitivity, even on the periphery of the image. The method of the invention hence demonstrates its robustness for microscope objectives of very various characteristics that cover a wide range of applications.

Another manner to verify the exactitude of the influence functions measured is to use the influence functions determined by the method of the invention to calculate the command vector to be sent to the deformable mirror 6 in such a manner to produce Zernike modes. A known Zernike mode is chosen, for example, to correct the astigmatism with a 60× objective. The resulting PSF measurement shows that the desired Zernike mode has been correctly produced by the command vector used. This is also confirmed by a wavefront measurement, using the Shack-Hartmann wavefront sensor.

The main domain of applications contemplated is the optical microscopy with wavefront shaping (correction of the aberrations and/or shaping of the pulse response), in particular for:
- imaging: confocal microscopy, multiphoton, super-resolutive, etc.
- laser photo-ablation;
- optical manipulation: photoactivation, photo-induced uncaging, etc.

The method and device of calibration of the invention similarly apply to a microscope comprising another type of spatial optical modulator of light than a deformable mirror to amplitude and/or phase modulate a light beam. In the general case of a spatial optical modulator, each element of the modulator is controlled by control means so as to modulate the amplitude and/or the phase of the light beam. Therefore, for a liquid crystal modulator, the elements are the pixels that are controlled by electrodes allowing application of a voltage to each pixel, which produces a determined local modulation of amplitude and/or phase.

By comparison to the wavefront measurement methods (directly or by interferometry), the method and device proposed according to the invention adapt to any type of source (continuous or pulsed, whatever the wavelength), of spatial optical modulator, of objective or of microscope and generates not much or even no modification of the existing device. Moreover, the invention provides a calibration of the complete active optical system (consisted by the unit: source+spatial optical modulator+microscope+objective) in the exact conditions in which it is intended to be used. Finally, the invention also provides a direct experimental measurement of the exciting pulse response for different commands applied to the elements of the spatial optical modulator.

Unlike the prior methods, the proposed method uses no modulation a priori of the wavefront. The invention is based on the direct measurement of the three-dimensional PSF, which then allow reconstructing the phase and intensity profile without approximation. Therefore, the whole active optical device consisted of the spatial optical modulator, the microscope and the objective is directly calibrated, as a function of the influence of a set of commands on the overall optical response of the system. The exact positioning of the spatial optical modulator in the system is thus intrinsically taken into account.

Furthermore, the calculation time required for the reconstruction of the phase profiles is highly reduced compared to the prior methods. The method of the invention allows obtaining the calibration of an active element within 20 to 50 seconds on a system with 2 MB RAM.

The method of the invention and the device now make it possible to significantly improve the resolution of the optical microscopes by allowing the effective integration of deformable mirrors in existing microscopes, to correct the aberrations therein.

The improvement of the calibration quality may allow improving the 3D resolution of an optical microscope coupled to a spatial optical modulator, in particular for:
- biological samples non homogeneous in volume;
- samples immersed into a medium of mismatched index; and/or
- a microscope whose optical system has residual optical aberrations.

An existing microscope may be modified to couple a spatial optical modulator and the calibration system thereof, without requiring costly adaptations. Indeed, most of the microscopes are commonly equipped with a port intended to receive a camera so as to form a magnified image of the focal plane of the objective.

The method and device of the invention allow a significant improvement—with moderate cost and complexity—of the imaging performance of an existing microscope.

The invention claimed is:

1. A method for the calibration of an optical device having a spatial optical modulator (6), said optical device comprising a light source point (1), an optical objective (8) of numerical aperture adapted to receive an optical beam incident on a sample and/or to collect an optical beam reflected by a sample, a camera (14) placed in a plane that is optically conjugate to a focal plane of the objective (8), and a spatial optical modulator placed on the optical beam upstream of the camera (14), said method comprising the steps of:
   a) placement of a reflective planar sample (10) in the focal plane of the objective (8);
   b) application of a command of amplitude $R^i_j$ on an element $P_i$ of the spatial optical modulator (6), in such a manner to modulate the optical beam incident and/or reflected on the sample (10);
   c) acquisition of an image of an intensity point spread function (PSF) in a plane conjugate to the focal plane of the objective (8);
   d) modification of an axial distance between the objective (8) and the reflecting sample (10) by a known quantity z;
   e) iteration of the steps c) and d) for a plurality of axial distances between the sample (10) and the focal plane of the objective (8);
   f) reconstruction of an amplitude and/or phase profile of the optical beam in a plane conjugate to the focal plane of the objective by a phase diversity algorithm for a value $R^i_j$ of an element $P_i$;
   g) iteration of the steps b) to f) for a plurality of amplitude values $R^i_j$ for an element $P_i$ of the spatial optical modulator (6);
   h) determination of an influence function $E_i$ of an element $P_i$ on the amplitude profile A and/or phase profile φ of the beam;
   i) iteration of the steps b) to h) for each element $P_{i\ i=1,\ldots,N}$ of the spatial optical modulator (6); and
   j) determination of the influence functions ($E_1, \ldots E_N$) of all the elements $P_1, \ldots P_N$ of the spatial optical modulator (6) on the amplitude profile A and/or phase profile φ of the optical beam,
   wherein PSF measurements are performed for three axial distances between the objective (8) and the sample (10), defined with respect to a position of the sample in the focal plane of the objective, in such a way that: $z=(-z_0, 0, +z_0)$, and
   wherein the step f) of reconstruction of the amplitude and/or phase profile of the beam comprises the following steps:
   estimation of a defocus term corresponding to the three axial positions $-z_0$, 0 and $+z_0$;
   initial estimation of a field profile in an entrance pupil of the objective;
   estimation of a transmission profile of the entrance pupil of the objective;
   calculation of three field profiles by multiplying the field profile estimated in the entrance pupil of the objective by each of the three defocus terms, respectively;
   application of a Fourier transform to calculate estimated PSFs for the three axial positions $-z_0$, 0 and $+z_0$;
   replacement of the amplitude of the calculated PSFs by a value of PSFs respectively measured for each of the values of z ($-z_0$, 0, $+z_0$);
   application of a reverse Fourier transform for the three fields obtained;
   division by the defocus term corresponding to each axial position z ($-z_0$, 0, $+z_0$) respectively, and averaging three complex fields obtained;
   multiplication of a field average by the transmission profile of the entrance pupil of the objective, to obtain a new estimation of the field profile at a rear pupil of the objective; and
   iteration of all the steps of calculation of the amplitude and/or phase profile reconstruction until an ending condition is fulfilled.

2. The method of calibration according to claim 1, further comprising:
   previous to step j), said additional step consisting in iterating the steps b) to i) for different simultaneous combinations of commands for a plurality of elements.

3. The method of calibration according to claim 1, further comprising:
   following step c), an additional step of digital filtering of the measured PSF images so as to reduce spatial resolution and/or to adapt size of the images to the size of the entrance pupil (9) of the objective (8).

4. The method of calibration according to claim 1, further comprising:
   following step j), an additional step of inversion of the influence functions of all the elements $P_1, \ldots P_N$ of the spatial optical modulator (6) by a linear regression algorithm to extract therefrom a calibration of the spatial optical modulator (6) in terms of amplitude $A(x,y)=M_A(R^i_t)$ and/or $R^i_t=M_A^{-1}(A(x,y))$ and in terms of phase $\phi(x,y)=M\phi(R^i_t)$ and/or $R^i_t=M\phi^{-1}(\phi(x,y))$, respectively.

5. A system for calibrating an optical microscope having a spatial optical modulator (6), said optical microscope having a light source point (1) that generates an incident optical beam (1a), an optical objective (8) of numerical aperture adapted to receive an incident beam and/or to collect an optical beam reflected by a sample, an image of the source point (1) formed in a focal plane of the objective (8), a spatial optical modulator (6) comprising a plurality of actuators ($P_1, \ldots P_N$), and actuators that control said actuators ($P_1, \ldots P_N$), the spatial optical modulator (6) being placed on the optical beam so as to modulate the incident and/or reflected optical beam, said system comprising:

a reflective planar sample (10) placed in the focal plane of the objective (8);

a positioning system (11) that positions a distance z between the focal plane of the objective (8) and said sample (10) to three axial positions: $-z_0$, 0 and $+z_0$;

an optical system (8, 12, 13) adapted to receive a part of an optical beam reflected by said sample (10) and to form an image of the focal plane of the objective (8) in a conjugate plane for each of the three axial positions $-z_0$, 0 and $+z_0$;

a camera (14) placed in said plane optically conjugate to the focal plane of the objective (8); and a computer (15), comprising a processor device, in connection with an interface that controls the positioning system, an interface that controls each of the actuators $(P_1, \ldots P_i, \ldots P_N)$ of the spatial optical modulator (6), and a memory device having programming code recorded therein that, upon execution, causes the computer to process images acquired by the camera (14) for a plurality of distances z adapted, deduce therefrom a measurement of a point spread function (PSF) of the optical device respectively corresponding to each of the three axial positions $-z_0$, 0 and $+z_0$, and determine values of commands to be applied to the positioning system (11) to adjust the distance z and to be applied to the actuators of the spatial optical modulator (6), respectively, as a function of PSF measurements corresponding to the three axial positions $-z_0$, 0 and $+z_0$.

6. The system of calibration according to claim 5, wherein the memory further includes programming code that causes the computer to reconstruct the amplitude and/or phase profile of the beam using a phase diversity algorithm.

7. The system of calibration according to claim 6, wherein the memory further includes programming code that causes the computer to determine influence functions $(E_1, \ldots E_N)$ of each of the actuators $P_1, \ldots P_N$ of the spatial optical modulator (6) on the amplitude profile A and/or phase profile $\phi$ of the beam.

8. The system of calibration according to claim 7, wherein the memory further includes programming code that causes the computer to inverse the influence functions of all the elements $P_1, \ldots P_N$ of the spatial optical modulator (6) by a linear regression algorithm.

* * * * *